(12) United States Patent
Michitaka et al.

(10) Patent No.: US 12,116,193 B2
(45) Date of Patent: Oct. 15, 2024

(54) WATER-SOLUBLE FILM AND MANUFACTURING METHOD THEREFOR

(71) Applicant: NIPPON SHOKUBAI CO., LTD., Osaka (JP)

(72) Inventors: Daisuke Michitaka, Osaka (JP); Hirotaka Mizoguchi, Osaka (JP)

(73) Assignee: Nippon Shokubai Co., Ltd., Osaka (JP)

( * ) Notice: Subject to any disclaimer, the term of this patent is extended or adjusted under 35 U.S.C. 154(b) by 1336 days.

(21) Appl. No.: 15/781,003

(22) PCT Filed: Dec. 1, 2016

(86) PCT No.: PCT/JP2016/085782
§ 371 (c)(1),
(2) Date: Jun. 1, 2018

(87) PCT Pub. No.: WO2017/094855
PCT Pub. Date: Jun. 8, 2017

(65) Prior Publication Data
US 2020/0307881 A1   Oct. 1, 2020

(30) Foreign Application Priority Data
Dec. 2, 2015   (JP) .................. 2015-236062

(51) Int. Cl.
| | |
|---|---|
| B65D 65/46 | (2006.01) |
| B65D 85/808 | (2006.01) |
| C08J 5/18 | (2006.01) |
| C08L 29/04 | (2006.01) |
| C08L 79/02 | (2006.01) |
| C09D 129/04 | (2006.01) |
| C09D 179/02 | (2006.01) |

(52) U.S. Cl.
CPC ............... *B65D 65/46* (2013.01); *C08J 5/18* (2013.01); *C08L 29/04* (2013.01); *C08L 79/02* (2013.01); *C09D 129/04* (2013.01); *C09D 179/02* (2013.01); *B65D 85/808* (2013.01); *C08J 2329/04* (2013.01); *C08J 2379/02* (2013.01); *C08L 2201/14* (2013.01); *C08L 2203/16* (2013.01)

(58) Field of Classification Search
CPC ........ B32B 27/306; C11D 17/042; C08J 5/18; C08J 2329/04; C08J 2379/02; C08J 2479/02; C09D 129/04; C09D 79/02; C09D 179/02; C08K 5/16; C08K 5/17; C08K 5/175; C08L 29/04; C08L 79/02; C08G 73/0206

USPC .............................................. 428/34.1–36.92
See application file for complete search history.

(56) References Cited

U.S. PATENT DOCUMENTS

| | | | | |
|---|---|---|---|---|
| 3,251,778 | A * | 5/1966 | Dickson ............. | C08G 73/0206 516/69 |
| 3,598,777 | A * | 8/1971 | Wade ...................... | C03C 25/26 428/404 |
| 3,786,113 | A * | 1/1974 | Vassileff ............... | C08L 33/062 525/185 |
| 4,119,604 | A | 10/1978 | Wysong | |
| 4,155,971 | A | 5/1979 | Wysong | |
| 4,156,047 | A | 5/1979 | Wysong | |
| 6,211,129 | B1 | 4/2001 | Gladfelter et al. | |
| 6,455,484 | B1 | 9/2002 | Gladfelter et al. | |
| 9,381,481 | B2 * | 7/2016 | Kou ......................... | C09C 3/08 |
| 2003/0119694 | A1 | 6/2003 | Gladfelter et al. | |
| 2004/0219297 | A1 | 11/2004 | Raehse et al. | |
| 2004/0259757 | A1 | 12/2004 | Gladfelter et al. | |
| 2005/0085404 | A1* | 4/2005 | Yoneda ................. | C08G 73/024 510/421 |
| 2005/0101513 | A1 | 5/2005 | Yoneda et al. | |
| 2005/0176897 | A1* | 8/2005 | Kanzaki ............... | C11D 3/3723 525/418 |
| 2006/0040845 | A1 | 2/2006 | Gladfelter et al. | |
| 2006/0162882 | A1 | 7/2006 | Ohara et al. | |
| 2006/0188487 | A1* | 8/2006 | Thomas ................. | C08L 29/04 514/54 |
| 2006/0292323 | A1* | 12/2006 | Hutchinson .............. | C08J 7/048 427/407.1 |
| 2007/0115323 | A1* | 5/2007 | Mori ...................... | B41J 2/1433 347/40 |
| 2009/0196897 | A1 | 8/2009 | Gladfelter et al. | |
| 2010/0218680 | A1 | 9/2010 | Yeager et al. | |
| 2010/0218681 | A1 | 9/2010 | Yeager et al. | |

(Continued)

FOREIGN PATENT DOCUMENTS

| | | | | |
|---|---|---|---|---|
| EP | 0945500 | * | 3/1999 | ............. C11D 1/146 |
| EP | 1512701 | * | 7/2004 | ............. C08L 29/04 |

(Continued)

*Primary Examiner* — Michael C Romanowski
(74) *Attorney, Agent, or Firm* — HSML P.C.

(57) ABSTRACT

The present invention provides a water-soluble film having high solubility in cold water and high extensibility. The present invention also provides a method for simply producing such a water-soluble film. One aspect of the present invention relates to a water-soluble film including a polyamine backbone-containing compound and a water-soluble resin. Another aspect of the present invention relates to a method for producing a water-soluble film containing a polyamine backbone-containing compound and a water-soluble resin including mixing the polyamine backbone-containing compound and the water-soluble resin.

16 Claims, No Drawings

(56) References Cited

U.S. PATENT DOCUMENTS

| | | | |
|---|---|---|---|
| 2010/0323189 A1* | 12/2010 | Illsley | C09D 129/04 428/354 |
| 2011/0186467 A1* | 8/2011 | Denome | C11D 17/042 524/387 |
| 2011/0189413 A1* | 8/2011 | Denome | C08L 29/04 524/387 |
| 2012/0128877 A1* | 5/2012 | Jain | C08J 3/203 427/213 |
| 2012/0238717 A1* | 9/2012 | Yoneda | C08F 216/1433 564/294 |
| 2013/0172506 A1* | 7/2013 | Yoneda | C11D 3/3723 526/312 |
| 2013/0256182 A1 | 10/2013 | Petrovicova et al. | |
| 2014/0227544 A1* | 8/2014 | Inoue | C09D 171/02 428/483 |
| 2014/0262092 A1* | 9/2014 | Fantini | C08G 73/0206 162/168.1 |
| 2014/0288265 A1* | 9/2014 | Ebert | C08G 65/2621 528/405 |
| 2014/0356603 A1* | 12/2014 | Kumar | B32B 37/0076 156/332 |
| 2015/0322387 A1* | 11/2015 | Ohtani | C11D 3/24 424/408 |
| 2015/0353869 A1* | 12/2015 | Stenger | C11D 17/042 510/276 |
| 2016/0102279 A1* | 4/2016 | Labeque | C11D 17/042 510/513 |
| 2016/0168513 A1* | 6/2016 | Wendt | C11D 17/0013 510/299 |
| 2017/0306112 A1* | 10/2017 | Takafuji | C08K 5/17 |
| 2018/0272286 A1* | 9/2018 | Gronwald | B01D 69/141 |

FOREIGN PATENT DOCUMENTS

| | | | | |
|---|---|---|---|---|
| JP | 53-024351 | | 3/1978 | |
| JP | H06240091 | * | 8/1994 | C08L 29/04 |
| JP | 9-208786 | | 8/1997 | |
| JP | 9-263670 | | 10/1997 | |
| JP | 9-324096 | | 12/1997 | |
| JP | 2000-063610 | | 2/2000 | |
| JP | 3135066 B | | 12/2000 | |
| JP | 2001-206435 | | 7/2001 | |
| JP | 2002-003896 | | 1/2002 | |
| JP | 3262406 B | | 3/2002 | |
| JP | 2003055450 A | * | 2/2003 | |
| JP | 2004-026859 | | 1/2004 | |
| JP | 2007-070493 | | 3/2007 | |
| JP | 2010-202870 | | 9/2010 | |
| JP | 2010-202872 | | 9/2010 | |
| JP | 2013-060562 | | 4/2013 | |
| WO | 2014/066339 | | 5/2014 | |
| WO | 2014/119739 | | 1/2017 | |
| WO | WO2017017146 | * | 2/2017 | B65D 65/42 |

* cited by examiner

WATER-SOLUBLE FILM AND MANUFACTURING METHOD THEREFOR

TECHNICAL FIELD

The present invention relates to a water-soluble film and a method for producing the water-soluble film.

BACKGROUND ART

Recently, detergents or chemicals such as agrochemicals are hermetically-packaged (unit-packaged) with a water-soluble film in certain amounts and the packaged products are directly put into water for the convenience of the consumer and the safe use by the consumer. As the water-soluble film dissolves in water, the contents are released. Thus, the effects of the contents are obtained. Such a technique is quite useful in the packaging field because it enables the use of the contents without direct touching and eliminates the measure of the amount of the contents and disposal of the package films.

Water-soluble films are typically made of a partially saponified polyvinyl alcohol-based polymer (also referred to as PVA) in terms of water solubility and strength. However, films made of PVA are poor in properties such as solubility in cold water. In order to solve such a problem, a technique of partial anionic modification of PVA or introduction of a water-soluble monomer into PVA by copolymerization has been proposed (see, for example, Patent Documents 1 to 5). In addition to these, water-soluble films made of PVA for packaging chemicals or detergents, for example, are also disclosed (see, for example, Patent documents 6 to 9).

CITATION LIST

Patent Document

Patent Document 1: JP 2007-70493 A
Patent Document 2: JP 2001-206435 A
Patent Document 3: JP H09-324096 A
Patent Document 4: JP 2002-3896 A
Patent Document 5: JP 3262406 B
Patent Document 6: JP 3135066 B
Patent Document 7: US 2013/0256182
Patent Document 8: JP S53-24351 A
Patent Document 9: US 2004/0219297

SUMMARY OF INVENTION

Technical Problem

Various proposals have been made for improving the physical properties of a film made of PVA as described above. However, these methods are not enough to provide sufficient solubility in water (water solubility), particularly in cold water (for example, having a temperature of 0° C. to 15° C.), and films showing a high dissolution rate even in cold water have not yet been obtained. There are also the following problems: reduction in film strength due to partial anionic modification of PVA or introduction of a water-soluble monomer and possible formation of a salt and precipitation thereof when a film is put into hard water.

The present invention has been made in view of the state of the art, and aims to provide a water-soluble film having high solubility in cold water and high extensibility. The present invention also aims to provide a method for simply producing such a water-soluble film.

Solution to Problem

The present inventors made various examinations on a water-soluble film and found that a water-soluble film containing a polyamine backbone-containing compound is a novel material that has never been reported before, and has sufficient solubility in water, particularly in cold water, and also has extensibility. These effects are further exerted particularly in the case where the water-soluble film additionally contains a water-soluble resin such as a polyvinyl alcohol-based polymer or in the case where the polyamine backbone-containing compound has a predetermined modified structure. The present inventors also found that such a water-soluble film has sufficient strength and can exhibit hard water resistance, deodorant properties, dispersibility of inorganic particles, anti-soil redeposition properties, and detergency. The present inventors also found that the water-soluble film can be simply and readily obtained by a production method that includes mixing a polyamine backbone-containing compound and a water-soluble resin. As a result, the above-mentioned problems have been admirably solved, leading to completion of the present invention.

That is, one aspect of the present invention relates to a water-soluble film including:
a polyamine backbone-containing compound; and
a water-soluble resin.

Preferably, the polyamine backbone-containing compound has a structure in which at least one amino group is modified with at least one group selected from the group consisting of (poly)alkylene glycol groups, carboxylic acid (salt) groups, hydrophobic groups, and sulfonic acid (salt) groups.

Another aspect of the present invention relates to a composition including:
a polyamine backbone-containing compound; and
a water-soluble resin.

Another aspect of the present invention relates to a method for producing a water-soluble film containing a polyamine backbone-containing compound and a water-soluble resin, the method including mixing the polyamine backbone-containing compound and the water-soluble resin.

Another aspect of the present invention relates to a packaged product including the water-soluble film of the present invention and a chemical and/or a detergent packaged in the water-soluble film.

Another aspect of the present invention relates to a method for producing a packaged product, the method including packaging a chemical and/or a detergent with the water-soluble film of the present invention.

Another aspect of the present invention relates to a packaging method including packaging a chemical and/or a detergent with the water-soluble film of the present invention.

Advantageous Effects of Invention

The water-soluble film of the present invention has high solubility in water, particularly in cold water, and high extensibility, and is therefore useful for various uses such as packaging materials. The composition of the present invention may be used for simply producing the water-soluble film of the present invention. The packaged product of the present invention is very useful when it is directly put into water and the contents are used as a chemical or a detergent.

The method for producing a water-soluble film of the present invention is capable of simply and readily providing such a water-soluble film, and is therefore useful particularly in the technical field of packaging materials, for example. The method for producing a packaged product of the present invention is capable of simply providing such a packaged product. The packaging method of the present invention is capable of simply packaging a chemical and/or a detergent.

DESCRIPTION OF EMBODIMENTS

Preferred embodiments of the present invention are described in detail below, but the present invention is not limited thereto. The preferred embodiments may be appropriately altered within the scope of the present invention. Combinations of two or three or more of the below-described preferred embodiments of the present invention are also preferred embodiments of the present invention.

[Water-Soluble Film]

The water-soluble film of the present invention contains a polyamine backbone-containing compound and a water-soluble resin. The water-soluble film of the present invention may contain only a polyamine backbone-containing compound as an essential component. For example, the water-soluble film may consist only of a polyamine backbone-containing compound. Such a water-soluble film containing a polyamine backbone-containing compound is also one aspect of the present invention. The water-soluble film may optionally contain a different component, as needed. The water-soluble film may contain one or two or more of each of the components.

The water-soluble film preferably mainly includes a water-soluble resin and a polyamine backbone-containing compound. The phrase "the water-soluble film mainly includes a water-soluble resin and a polyamine backbone-containing compound" means that the proportion by mass of the water-soluble resin and the proportion by mass of the polyamine backbone-containing compound are both larger than the proportion(s) by mass of the component(s) other than the polyamine backbone-containing compound and the water-soluble resin. Here, the water-soluble film may consist only of a water-soluble resin and a polyamine backbone-containing compound. The blending ratio by mass between the water-soluble resin and the polyamine backbone-containing compound (water-soluble resin/polyamine backbone-containing compound) is preferably (1 to 99)/(99 to 1), for example. In terms of the balance between the film strength and the solubility in cold water, the proportion of the water-soluble resin is preferably 1% by mass or more, more preferably 10% by mass or more, still more preferably 20% by mass or more, further more preferably 30% by mass or more, still further more preferably 40% by mass or more, particularly preferably 50% by mass or more, more particularly preferably 60% by mass or more of 100% by mass of the total amount of the water-soluble resin and the polyamine backbone-containing compound (a larger value is better). The proportion of the water-soluble resin is preferably 99% by mass or less, more preferably 98% by mass or less, still more preferably 95% by mass or less (a smaller value is better).

In other words, the proportion of the polyamine backbone-containing compound is preferably 1% by mass or more, more preferably 2% by mass or more, still more preferably 5% by mass or more of 100% by mass of the total amount of the water-soluble resin and the polyamine backbone-containing compound (a larger value is better). The proportion of the polyamine backbone-containing compound is preferably 99% by mass or less, more preferably 90% by mass or less, still more preferably 80% by mass or less, further more preferably 70% by mass or less, still further more preferably 60% by mass or less, particularly preferably 50% by mass or less, more particularly preferably 40% by mass or less (a smaller value is better).

The thickness of the water-soluble film may be appropriately set in accordance with factors such as its uses, and is preferably, but not limited to, 5 to 300 μm in terms of the balance between the film strength and the solubility of the film in cold water, for example. The thickness is more preferably 6 to 200 μm, still more preferably 7 to 150 μm, further preferably 8 to 100 μm, particularly preferably 9 to 90 μm, most preferably 10 to 80 μm.

When the water-soluble film has a thickness of 40 μm, the dissolution time thereof in cold water having a temperature of 6° C. is preferably 5 to 240 seconds. A film dissolving too quickly (the dissolution time is too short) may have high moisture absorbency and may fail to sufficiently keep the film shape under usual storage conditions due to moisture in the air. A film dissolving too slowly (the dissolution time is too long) may fail to more efficiently release chemicals. The dissolution time is more preferably 205 seconds or shorter, still more preferably 190 seconds or shorter, particularly preferably 160 seconds or shorter, further preferably 140 seconds or shorter, further more preferably 120 seconds or shorter, most preferably 100 seconds or shorter. The dissolution time is more preferably 7 seconds or longer, still more preferably 8 seconds or longer, particularly preferably 9 seconds or longer, further preferably 10 seconds or longer, most preferably 15 seconds or longer.

The dissolution time (in the case of 40 μm) may be determined based on the solubility evaluation method described in the Examples below.

The water-soluble film also preferably has an extensibility of 23% or higher. The film having an extensibility of 23% or higher may have excellent load capacity, and may be useful as a material for packaging a chemical or a detergent. The extensibility is more preferably 40% or higher, still more preferably 70% or higher, particularly preferably 100% or higher.

The extensibility may be determined based on the extensibility evaluation method described in the Examples below.

The water-soluble film also preferably has a hard water resistance of 94% or higher. The film having hard water resistance of 94% or higher may not cause precipitation or turbidity of water when the film is put into hard water. On the other hand, in the case of a film having hard water resistance of lower than 94%, it is difficult to more sufficiently suppress the formation of a salt and precipitation thereof and the turbidity of water when the film is put into hard water. The hard water resistance is more preferably 95% or higher, still more preferably 96% or higher, particularly preferably 97% or higher.

The hard water resistance may be determined based on the hard water resistance evaluation method described in the Examples below.

When the water-soluble film has a thickness of 40 μm, the film preferably has a strength of 0.05 J or higher. The film having a strength of 0.05 J or higher may stably maintain the packaging of chemicals or detergents, for example. The strength is more preferably 0.08 J or higher, still more preferably 0.1 J or higher.

The film strength (in the case of 40 μm) may be determined based on the strength evaluation method described in the Examples below.

The following describes the polyamine backbone-containing compound, the water-soluble resin, and other suitable components in the water-soluble film.

<Polyamine Backbone-Containing Compound>

The polyamine backbone-containing compound may be any compound that contains a polyamine backbone in the structure, and preferably contains a branched-chain structure in order to more sufficiently achieve the effects of the present invention. The polyamine backbone-containing compound is more preferably a compound having a structure in which a branch is present at an amino group.

The polyamine backbone-containing compound is preferably a compound that is readily soluble in water at room temperature (20° C. to 25° C.). For example, the polyamine backbone-containing compound preferably has a solubility of 10 g or more in 100 g of water at 20° C. However, when the polyamine backbone-containing compound is a high molecular weight polymer (having a weight average molecular weight of 10,000,000 or more, for example), the solubility of the polyamine backbone-containing compound may possibly be reduced due to an increase in the viscosity of its aqueous solution even if the polyamine backbone-containing compound is water-soluble. Thus, a polymer having a solubility of 0.1 g in 100 g of water at 20° C. may be acceptable as the polyamine backbone-containing compound.

The polyamine backbone-containing compound preferably contains all of a primary amino group, a secondary amino group (also referred to as an imino group), and a tertiary amino group. As described above, the polyamine backbone-containing compound is preferably a compound having a structure in which a branch is present at an amino group, and the compound containing all of primary to tertiary amino groups is one preferred embodiment of a compound having many amino groups in the structure and a structure in which a branch is present at an amino group.

The amine value of the polyamine backbone-containing compound is preferably, but not limited to, 5 to 30, for example. At such an amine value, the solubility in cold water and the film strength can be more increased. The amine value is more preferably 10 to 30, still more preferably 15 to 25. The amine value may be measured by potentiometric titration using a strong acid such as hydrochloric acid, sulfuric acid, or a paratoluenesulfonic acid solution.

The weight average molecular weight (Mw) of the polyamine backbone-containing compound is preferably, but not limited to, 100 to 100,000, for example, in order to more increase the film strength and the solubility. The Mw is more preferably 200 to 80000, still more preferably 300 to 70000, particularly preferably 500 to 68000, further preferably 500 to 30000, most preferably 550 to 20000.

The weight average molecular weight of the polyamine backbone-containing compound is a value determined by gel permeation chromatography (GPC) and may be measured under the measurement conditions described in the Examples below.

The polyamine backbone-containing compound is suitably a compound represented by the following formula (1):

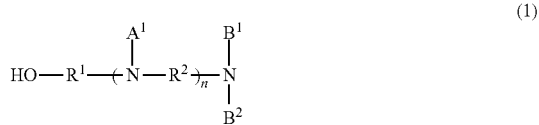

(1)

wherein $R^1$ and $R^2$ are the same as or different from each other and each represent a C1-C6 linear or branched alkylene group; $A^1$s are the same as or different from each other and each represent a hydrogen atom or another polyamine backbone as a branch (also referred to as a polyamine chain) represented by $-R^1-\{(N(A^1)(R^2)\}_n-N(B^1)B^2$ in which the symbols in this chemical formula may or may not each represent an atom or a group represented by the corresponding symbol in the formula (1), the hydrogen atoms therein being optionally replaced with a modifying group; $B^1$ and $B^2$ represent hydrogen atoms and may optionally be replaced with the same or different modifying groups; and n represents an integer of 1 or greater. This compound corresponds to a polyamine or a compound having a structure in which at least one amino group of a polyamine is modified. The latter compound preferably has a structure modified with at least one group selected from the group consisting of (poly)alkylene glycol groups, carboxylic acid (salt) groups, hydrophobic groups, and sulfonic acid (salt) groups.

Preferred polyamines providing the polyamine backbone-containing compound are polyalkyleneamines (PAAs) and polyalkyleneimines (PAIs) are preferred. In particular, a polyalkyleneimine containing all of a primary amino group, a secondary amino group, and a tertiary amino group is preferred in order to further achieve the effects of the invention. In this case, n in the formula (1) represents an integer of 2 or greater, at least one of $A^1$s is a hydrogen atom, and at least one of $A^1$s is a polyamine chain as a branch. Therefore, the polyamine backbone-containing compound in the present invention is particularly preferably a polyalkyleneimine backbone-containing compound.

Examples of the polyalkyleneamines (PAAs) include polyethyleneamines (PEAs) and tetrabutylenepentamine. PEAs may be obtained by reacting ammonia with ethylene dichloride, followed by fractional distillation. The thus PEAs obtained include triethylenetetramine (TETA) and tetraethylenepentamine (TEPA).

Preferred examples of the polyalkyleneimines (PAIS) include homopolymers and copolymers of alkyleneimine(s) obtained by polymerizing one or two or more of C2-C6 alkyleneimines such as ethyleneimine, propyleneimine, 1,2-butyleneimine, 2,3-butyleneimine, and 1,1-dimethylethyleneimine by a usual method. More preferred is an ethyleneimine homopolymer (polyethylenimine, also referred to as PEI). PAIS may also include those obtained by polymerizing, for example, ethylenediamine, diethylenetriamine, triethylenetetramine, and/or tetraethylenepentamine. Such polyalkyleneimines usually contain not only a tertiary amino group but also a primary amino group and/or a secondary amino group (imino group) in the structure.

A polyalkyleneimine chain is formed in the homopolymers and copolymers of alkyleneimine(s). The ratio between the secondary amino group and the tertiary amino group in the homopolymers and copolymers of alkyleneimine(s) (secondary amino group/tertiary amino group) is preferably 4/1 to 1/4, more preferably 3/1 to 1/3, still more preferably 2.5/1 to 1/2, most preferably 2/1 to 1/1. Further, the ratio between the primary amino group and the secondary amino group in the homopolymers and copolymers of alkyleneimine(s) (primary amino group/secondary amino group) is preferably 4/1 to 1/5, more preferably 3/1 to 1/4, still more preferably 2/1 to 1/3, most preferably 1/1 to 1/2.

In the present invention, the polyamine backbone is preferably formed mainly of ethyleneimine. In this case, the term "mainly" means that when the polyamine chain is formed from two or more types of alkyleneimines, the ethyleneimine accounts for the most part of all the alkyleneimines in terms of the number of moles. The amount in terms of mol % of the ethyleneimine that "accounts for the most part" is preferably 50 to 100 mol % in 100 mol % of all the alkyleneimines. In such a case, the properties such as the solubility in cold water, strength, and hard water resistance are further enhanced. The amount is more preferably 60 to 100 mol %, still more preferably 70 to 100 mol %.

When the polyamine backbone-containing compound is polyethylenimine, the proportion of the primary amino group in 100 mol % of all the amino groups in the polyethylenimine is preferably 10 to 50 mol %. In such a case, the effects of the present invention are more sufficiently achieved. The proportion is more preferably 20 to 45 mol %, still more preferably 25 to 40 mol %, particularly preferably 27 to 37 mol %.

The relative proportions of the units derived from the nitrogen atoms of the primary, secondary, and tertiary amino groups in the polyamine backbone may be appropriately selected depending on the production method, particularly in the case of PEI. PEI can be produced by polymerizing ethyleneimine in the presence of a catalyst such as carbon dioxide, sodium bisulfite, sulfuric acid, hydrogen peroxide, hydrochloric acid, or acetic acid.

$A^1$s in the formula (1) are the same as or different from each other and each represent a hydrogen atom or a polyamine chain as a branch, and each may optionally be modified with a substituent using an acid anhydride, an epoxy compound, or an acid halide, or by the Michael addition reaction, for example. Similarly, $B^1$ and/or $B^2$ in the formula (1) also represent(s) a hydrogen atom, and may optionally be modified with a modifying group. The modification rates of $A^1$ and $B^1$ and/or $B^2$ are preferably appropriately set between 0 to 100 mol % depending on the uses or desired purposes. Suitable ranges of the modification rates and suitable d modifying groups are described below.

The polyamine backbone-containing compound also preferably has a structure in which at least one of the amino groups of the polyamine is modified, depending on desired performance, for example. In particular, the polyamine backbone-containing compound more preferably has a structure modified with at least one group selected from the group consisting of (poly)alkylene glycol groups, carboxylic acid (salt) groups, hydrophobic groups, and sulfonic acid (salt) groups. A (poly)alkylene glycol group enhances the solubility in cold water, film strength, anti-soil redeposition properties, and detergency. A carboxylic acid (salt) group enhances the solubility in cold water and dispersibility of inorganic particles (e.g. carbon black). A hydrophobic group can enhance the film strength and provide antimicrobial effects. A sulfonic acid (salt) group more enhances the hard water resistance. The combination of a carboxylic acid (salt) group and a sulfonic acid (salt) group more significantly enhances the hard water resistance.

An amino group to be modified may be a terminal amino group (primary amino group) or an amino group of the main chain (secondary amino group, imino group). When two or more amino groups are modified, these amino groups may be modified by the same groups or different groups.

Here, the carboxylic acid (salt) group means a carboxyl group and/or a carboxylic acid salt, and the sulfonic acid (salt) group means a sulfonic acid group and/or a sulfonic acid salt. The carboxylic acid salt and the sulfonic acid salt are each preferably a metal salt, an ammonium salt, or an organic amine salt. Examples of the metal atom of the metal salt include monovalent metals such as sodium, lithium, potassium, rubidium, and cesium; divalent metals such as magnesium, calcium, strontium, and barium; trivalent metals such as aluminum; and other metals such as iron. Examples of the organic amine group of the organic amine salt include alkanol amine groups such as a monoethanolamine group, a diethanolamine group, and a triethanolamine group; alkylamine groups such as a monoethyl amine group, a diethyl amine group, and a triethylamine group; and polyamine groups such as an ethylenediamine group and a triethylenediamine group. Preferred among the above-described salts are an ammonium salt, a sodium salt, and a potassium salt, and more preferred is a sodium salt.

The proportion of the modified amino group may vary depending on desired performance, for example. In order to enhance the deodorant properties and cohesiveness, the amount of amino groups is preferably large, and thus the proportion of the modified amino group in 100 mol % of all the amino groups of the polyamine is preferably 50 mol % or less, more preferably 30 mol % or less, still more preferably 10 mol % or less, for example. Whereas, in order to provide or enhance the solubility in cold water, film strength, anti-soil redeposition properties, detergency, dispersibility of inorganic particles, antimicrobial properties, or hard water resistance, as described above, the proportion of the modified amino group in 100 mol % of all the amino groups of the polyamine is preferably 10 mol % or more, more preferably 50 mol % or more, still more preferably 90 mol % or more.

The proportion of the modified amino group can be measured by, for example, NMR, HPLC, or GPC.

The following describes a preferred example of the method for producing a compound having a structure in which at least one amino group is modified with the above-described modifying group. A compound modified with two or more modifying groups can be preferably obtained by appropriately combining the below-described methods.

(i) Modification with (Poly)Alkylene Glycol Group

When the polyamine backbone-containing compound is a compound having a structure in which at least one amino group is modified with a (poly)alkylene glycol group, the compound can be readily obtained by addition reaction of an alkylene oxide to a polyamine. The addition reaction may be performed by any method, and may be performed by a usual method. Regarding the compounds used in the reaction, one or two or more types of each compound may be used in the reaction.

The alkylene oxide is not limited, and one or two or more C1-C30 alkylene oxides may be used. In order to enhance the solubility, the number of carbon atoms of the alkylene oxide is preferably 2 to 8, more preferably 2 to 4, still more preferably 2. When two or more alkylene oxides are added, these alkylene oxides may be added randomly, in block, or alternately, for example.

The average number of moles of alkylene oxide added is preferably, but not limited to, 1 to 300. In order to maintain the film strength and enhance the solubility, the average number of moles of alkylene oxide added is more preferably 2 to 300, still more preferably 5 to 150, particularly preferably 10 to 100, most preferably 10 to 50.

The average number of moles of alkylene oxide added is a mean value of the numbers of moles of the alkylene oxide added to 1 mol of the polyamine backbone (preferably polyalkyleneimine backbone).

Modification treatment may be further performed after the addition reaction of an alkylene oxide. The polyamine backbone-containing compound in the present invention encompasses thus modified compounds. For example, part or all of the hydroxy groups present at ends may be modified after the addition reaction of an alkylene oxide. The modification treatment may be performed by any method, and may be performed with reference to JP 2006-241372 A (see, for example, [0017] to [0044]), for example.

In addition, the polyamine backbone-containing compound having a structure in which at least one amino group is modified with a (poly)alkylene glycol group can also be obtained by reacting a polyamine, an epoxy compound, and a bisulfite. This method may be performed with reference to JP 2013-60562 A (see, for example, [0028] to [0039]), for example.

(ii) Modification with Carboxylic Acid (Salt) Group

When the polyamine backbone-containing compound is a compound having a structure in which at least one amino group is modified with a carboxylic acid (salt) group, the compound can be readily obtained by Michael addition reaction of a carboxylic acid-based monomer to a polyamine. The addition reaction may be performed by any method, and is preferably performed with reference to JP 2004-2589 A (see, for example, [0011] to [0016]), for example. One or two or more of each compound may be used in the reaction.

In this case, the amount of the carboxylic acid-based monomer added to the polyamine is not limited, and is preferably set such that the carboxylic acid-based monomer is added to 1 to 80 mol %, more preferably 5 to 70 mol %, still more preferably 10 to 60 mol % of nitrogen atoms in 100 mol % of all the nitrogen atoms of the polyamine, for example.

The carboxylic acid-based monomer is a compound that contains an unsaturated double bond (carbon-carbon double bond) and a carboxylic acid (salt) group (i.e. carboxyl group and/or carboxylic acid salt). In particular, preferred are an unsaturated monocarboxylic acid-based monomer containing an unsaturated double bond and one carboxylic acid (salt) group in one molecule and an unsaturated dicarboxylic acid-based monomer containing an unsaturated double bond and two carboxylic acid (salt) groups in one molecule.

Examples of the unsaturated monocarboxylic acid-based monomer include unsaturated monocarboxylic acids such as (meth)acrylic acid, crotonic acid, α-hydroxyacrylic acid, α-hydroxymethylacrylic acid, and derivatives thereof, and salts thereof. The acrylic acids and the methacrylic acids are collectively referred to as "(meth)acrylic acids".

Examples of the unsaturated dicarboxylic acid-based monomer include unsaturated dicarboxylic acids such as maleic acid, itaconic acid, citraconic acid, fumaric acid, mesaconic acid, and 2-methylene glutaric acid, and salts and anhydrides thereof. Further, a half ester of the unsaturated dicarboxylic acid-based monomer and an alcohol (e.g. a C1-C22 alcohol), a half amide of the unsaturated dicarboxylic acid-based monomer and an amine (e.g. a C1-C22 amine), a half ester of the unsaturated dicarboxylic acid-based monomer and a glycol (e.g. a C2-C4 glycol), or a half amide of a maleamic acid and a glycol (e.g. a C2-C4 glycol) may be used.

Preferred among the carboxylic acid-based monomers is at least one selected from the group consisting of (meth) acrylic acid, maleic acid, and salts thereof. More preferred are/is (meth)acrylic acid and/or a salt thereof. Thus, a water-soluble film having better solubility in cold water and strength can be obtained. Still more preferred are/is acrylic acid and/or a salt thereof.

Modification treatment may be further performed after the addition reaction of a carboxylic acid-based monomer. For example, hydrophobicity may be imparted by reacting with a halogenated alkyl, or the molecular weight may be increased by linking polymers to each other using a polyfunctional compound.

(iii) Modification with Hydrophobic Group

When the polyamine backbone-containing compound is a compound having a structure in which at least one amino group is modified with a hydrophobic group, the compound can be readily obtained by addition reaction of a hydrophobic group-containing monomer to a polyamine. The addition reaction may be performed by any method, and is preferably performed with reference to JP 2005-170977 A (see, for example, [0033] to [0040]), for example. One or two or more of each compound may be used in the reaction.

In this case, the amount of the hydrophobic group-containing monomer added to the polyamine is not limited, and is preferably set such that the amount of the hydrophobic group is 0.1 to 20 mol % relative to 100 mol % of all the nitrogen atoms of the polyamine in order to enhance the solubility in cold water, for example. The amount of the hydrophobic group is more preferably 0.3 to 12 mol %, still more preferably 0.4 to 9 mol %, particularly preferably 0.5 to 8 mol %.

The hydrophobic group-containing monomer is a compound that contains an unsaturated double bond (carbon-carbon double bond) and one or two or more hydrophobic groups. The hydrophobic group is preferably, but not limited to, a hydrocarbon group, for example. Specific examples thereof include alkyl, alkenyl, alkynyl, cycloalkyl, and aryl groups. Preferred among these are alkyl, alkenyl, and aryl groups, and more preferred are alkyl and alkenyl groups. The number of carbon atoms of the hydrocarbon group is preferably 1 to 30, more preferably 2 to 20, still more preferably 5 to 20 in terms of hydrophobicity and polymerizability.

The hydrophobic group may optionally contain a heteroatom as long as the hydrophobic group has hydrophobicity, and may be a group in which a hydrogen atom of the hydrocarbon group is replaced with halogen, for example.

Specific examples of the hydrophobic group-containing monomer include (meth)acrylic acid alkyl ester-based monomers such as butyl (meth)acrylate, 2-ethylhexyl (meth) acrylate, and dodecyl (meth)acrylate; vinyl aryl monomers such as styrene, indene, and vinyl aniline; and compounds represented by the following formula (2). In particular, preferred are the compounds represented by the formula (2):

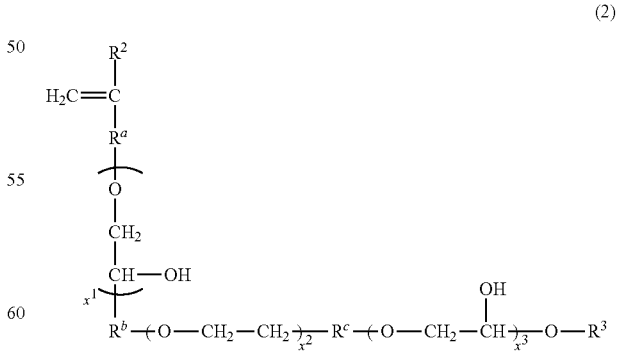

wherein $R^2$ represents a hydrogen atom or a $CH_3$ group; $R^a$, $R^b$, and $R^c$ are the same as or different from each other and each represent a $CH_2$ group, a $CH_2CH_2$ group, or a direct bond; $x^1$ represents the number of units represented by (O—CH$_2$—CH(OH)) and is 0 or 1; x$^2$ represents the number of units represented by (O—CH$_2$—CH$_2$) and is 0 to 100; x$^3$ represents the number of units represented by (O—CH$_2$—CH(OH)) and is 0 or 1, where x$^2$ is 1 to 100 and x$^3$ is 1 when R$^a$, R$^b$, and R$^c$ each represent a direct bond and x$^1$ is 0; and R$^3$ represents a hydrophobic group.

In the formula (2), R$^2$ represents a hydrogen atom or a CH$_3$ group, preferably a hydrogen atom; and R$^a$, R$^b$, and R$^c$ are the same as or different from each other and each represent a CH$_2$ group, a CH$_2$CH$_2$ group, or a direct bond, and preferably, R$^a$ and R$^b$ each represent a CH$_2$ group and R$^c$ represents a direct bond. The hydrophobic group represented by R$^3$ is preferably a hydrocarbon group as described above, and preferred embodiments thereof and preferred range of the number of carbon atoms of the hydrocarbon group are as described above. The hydrophobic group may optionally contain a heteroatom as long as the hydrophobic group has hydrophobicity as described above.

The symbol x$^1$ represents the number of units represented by (O—CH$_2$—CH(OH)) and is 0 or 1. The symbol x$^1$ is preferably 1. Thus, the hydrophilicity of the hydrophobic group-containing monomer is more enhanced. Therefore, even if the proportion of the monomer in the monomer component is increased, the polymerization reaction is more sufficiently carried out. The structure represented by (O—CH$_2$—CH(OH)) may be formed by reacting a glycidyl group with a hydroxy group of, for example, an alcohol or an alkylene oxide adduct.

x$^2$ represents the number of units represented by (O—CH$_2$—CH$_2$) and is 0 to 100 (x$^2$ is 1 to 100 when R$^a$, R$^b$, and R$^c$ each represent a direct bond and x$^1$ is 0). When x$^2$ is 1 to 100, the monomer has more enhanced hydrophilicity, and therefore readily reacts even when a hydrophilic solvent such as water is used. In particular, x$^2$ is preferably 1 to 50. When x$^2$ is 0, the effects of the hydrophobic group represented by R$^3$ can be more sufficiently achieved. In terms of the hydrophobicity of the resulting copolymer, x$^2$ is more preferably 0. Thus, the x$^2$ value is preferably controlled in consideration of the balance between the hydrophilicity and the hydrophobicity.

x$^3$ represents the number of units represented by (O—CH$_2$—CH(OH)) and is 0 or 1 (x$^3$ is 1 when R$^a$, R$^b$, and R$^c$ each represent a direct bond and x$^1$ is 0). x$^3$ is preferably 0.

Examples of the hydrophobic group-containing monomer represented by the formula (2) include compounds prepared by reacting an unsaturated double bond-containing alcohol (e.g. vinyl alcohol, allyl alcohol, or isoprenol) with a C1-C30 (most preferably C4-C6) alkyl glycidyl ether; compounds prepared by reacting an ethylene oxide adduct of an unsaturated double bond-containing alcohol with a C1-C30 (most preferably C4-C6) halogenated alkyl; C1-C30 alkyl glycidyl ethers; and compounds prepared by reacting an allyl glycidyl ether with a C1-C30 (most preferably C4-C6) alcohol or an ethylene oxide adduct of a C1-C30 (most preferably C4-C6) alcohol.

The hydrophobic group-containing monomer is particularly preferably a compound represented by the following formula (3). The symbols in the formula are as described above, and R$^2$ is preferably a hydrogen atom and R$^a$ is preferably a CH$_2$ group. The hydrophobic group represented by R$^3$ is preferably a hydrocarbon group as described above.

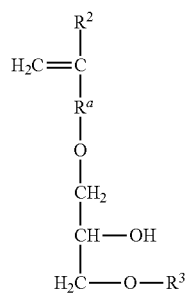

(3)

Modification treatment may be further performed after the addition reaction of a hydrophobic group-containing monomer. For example, hydrophilicity may be imparted by reacting with a carboxylic acid-based monomer, or the molecular weight may be increased by linking polymers to each other using a polyfunctional compound.

(iv) Modification with Sulfonic Acid (Salt) Group

When the polyamine backbone-containing compound is a compound having a structure in which at least one amino group is modified with a sulfonic acid (salt) group, the compound can be readily obtained by addition reaction of a sulfonic acid-based monomer to a polyamine. The addition reaction may be performed by any method. One or two or more of each compound may be used in the reaction.

In this case, the amount of the sulfonic acid-based monomer added to the polyamine is not limited, and is preferably set such that the amount of the sulfonic acid (salt) group is 0.1 to 80 mol % relative to 100 mol % of all the nitrogen atoms of the polyamine in order to enhance the solubility in cold water, for example. The amount of the sulfonic acid (salt) group is more preferably 0.3 to 70 mol %, still more preferably 0.4 to 50 mol %, particularly preferably 0.5 to 30 mol %.

The sulfonic acid-based monomer is a compound that contains an unsaturated double bond (carbon-carbon double bond) and a sulfonic acid (salt) group (i.e. sulfonic acid group and/or sulfonic acid salt). Specific examples thereof include unsaturated sulfonic acids such as vinylsulfonic acid, styrenesulfonic acid, (meth)allylsulfonic acid, 3-(meth)allyloxy-2-hydroxypropanesulfonic acid, 3-(meth)allyloxy-1-hydroxypropanesulfonic acid, 2-(meth)allyloxy-ethylenesulfonic acid, 2-acrylamido-2-methylpropanesulfonic acid, (meth)allyloxybenzenesulfonic acid, isoprenesulfonic acid, 2-methylpropanesulfonic acid (meth)acrylamide, 2-hydroxy-3-allyloxysulfonic acid, sulfoethyl (meth)acrylate, sulfopropyl (meth)acrylate, and sulfobutyl (meth)acrylate and salts thereof.

The sulfonic acid-based monomer is particularly preferably a compound represented by the following formula (4) in terms of economic efficiency and structural stability. The compound can be obtained according to the method disclosed in JP 5558357 B, for example.

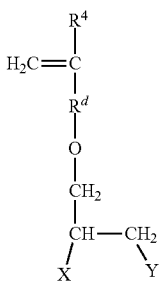

(4)

In the formula, $R^4$ represents a hydrogen atom or a $CH_3$ group; $R^d$ represents a $CH_2$ group, a $CH_2CH_2$ group, or a direct bond; and X and Y are the same as or different from each other and each represent a hydroxy group or a sulfonic acid (salt) group where one or both of X and Y represent a sulfonic acid (salt) group.

In the formula (4), $R^4$ represents a hydrogen atom or a $CH_3$ group, preferably a hydrogen atom; $R^d$ represents a $CH_2$ group, a $CH_2CH_2$ group, or a direct bond, preferably a $CH_2$ group. X and Y are the same as or different from each other and each represent a hydroxy group or a sulfonic acid (salt) group, and preferably, one of X and Y represents a sulfonic acid (salt) group, and the other represents a hydroxy group.

Also, the compound having a structure in which at least one amino group is modified with the above-described modifying group can be readily obtained by addition reaction of a compound having an epoxy group and at least one of the modifying groups (also referred to as epoxy group-containing compound) to a polyamine. The addition reaction may be performed by any method, and is preferably performed with reference to JP S61-64324 A or JP 2005-170977 A (in particular, see, for example, [0026] and [0033] to [0041]), for example. One or two or more of each compound may be used in the reaction.

In this case, the amount of the epoxy group-containing compound added to the polyamine is not limited, and is preferably set such that the amount of the modifying group in the epoxy group-containing compound is 0.1 to 20 mol % relative to 100 mol % of all the nitrogen atoms of the polyamine, for example. The amount of the modifying group is more preferably 0.2 to 15 mol %, still more preferably 0.3 to 12 mol %, particularly preferably 0.4 to 9 mol %, most preferably 0.5 to 8 mol %. For example, the amount of the epoxy group-containing compound is preferably 0.01 to 2 parts by weight, more preferably 0.05 to 1.8 parts by weight, still more preferably 0.1 to 1.5 parts by weight, particularly preferably 0.3 to 1.5 parts by weight, most preferably 0.5 to 1.2 parts by weight, per 1 part by weight of the polyamine.

The epoxy group-containing compound means a compound that has the modifying group (preferably at least one group selected from the group consisting of (poly)alkylene glycol groups, carboxylic acid (salt) groups, hydrophobic groups, and sulfonic acid (salt) groups) and one or two or more oxirane ring structures. In particular, a hydrophobic group-containing compound is preferred. Preferred specific examples thereof include glycidyl ether compounds containing an alkyl group, an alkenyl group, or an (alkyl)aryl group; epoxy alkenes; and aryl group-containing epoxy alkanes. These hydrocarbon groups may be linear or branched.

In the case of a glycidyl ether compound containing an alkyl group or an alkenyl group, the number of carbon atoms of the alkyl group or the alkenyl group is preferably 1 to 30, more preferably 2 to 20, still more preferably 3 to 18, particularly preferably 4 to 13. Preferred specific examples thereof include butyl, nonyl, decyl, undecyl, dodecyl, tridecyl, and pentadecyl groups. In the case of a glycidyl ether compound containing an aryl group (that may optionally contains an alkyl group), the number of carbon atoms of the aryl group is preferably 6 to 30, more preferably 6 to 20, still more preferably 6 to 15, particularly preferably 6 to 12. Specifically, phenyl, toluyl, and naphthyl groups are preferred, for example. In particular, a phenyl group is more preferred.

Specific examples of the glycidyl ether compounds include alkyl glycidyl ethers such as nonyl glycidyl ether and decyl glycidyl ether; (alkyl)phenyl glycidyl ethers such as phenyl glycidyl ether and octyl phenyl glycidyl ether; glycidyl ethers of (alkyl)cycloalkanols, such as cyclopentyl glycidyl ether, cyclohexyl glycidyl ether, octyl cyclopentyl glycidyl ether, and octyl cyclohexyl glycidyl ether; and (alkyl)benzyl glycidyl ethers such as benzyl glycidyl ether and octyl benzyl glycidyl ether.

The glycidyl ether compounds may optionally further contain a (poly)alkylene glycol group in addition to an alkyl, alkenyl, or (alkyl)aryl group and an oxirane ring structure. Preferred embodiments of the alkylene oxide included in the (poly)alkylene glycol group are the same as those described in (i) Modification with (poly)alkylene glycol group. The average number of moles of alkylene oxide added is preferably, but not limited to, 1 to 30, for example. Examples of the glycidyl ether compound further containing a (poly)alkylene glycol group include alkyl polyoxyethylene glycidyl ethers; (alkyl)phenyl polyoxyethylene glycidyl ethers; (alkyl)cycloalkyl polyoxyethylene glycidyl ethers; and (alkyl)benzyl polyoxyethylene glycidyl ethers.

The epoxy alkene and the aryl group-containing epoxy alkane are preferably compounds not containing an ether linkage, that is, ether-linkage-free compounds. The number of carbon atoms of the epoxy alkene is preferably 1 to 30, more preferably 2 to 20, still more preferably 4 to 18, particularly preferably 7 to 13. The number of carbon atoms of the aryl group-containing epoxy alkane is preferably 1 to 30, more preferably 2 to 20, still more preferably 3 to 18, particularly preferably 4 to 13. The aryl group-containing epoxy alkane is particularly preferably an epoxy alkane containing a phenyl, toluyl, or naphthyl group. In particular, styrene oxide is preferred.

<Water-Soluble Resin>

The water-soluble resin used in the present invention is readily soluble or dispersible in water. Specifically, the water-soluble resin is preferably a resin having a solubility of 0.05 g or more, more preferably 0.1 g or more in 100 g of water having a temperature of 20° C. The resin may be made of any material as long as it has such properties. For example, cellulose derivatives such as cellulose, methyl cellulose, hydroxypropyl cellulose, carboxymethyl cellulose, and salts thereof; polyvinyl alcohol-based materials; pullulan; starch-based materials; and polyalkylene oxide-based materials may be used.

The water-soluble resin is available under the following trade names, for example: Pullulan Film (produced by Hayashibara Co., Ltd.) made of pullulan; Dissolvo (produced by Mishima Paper Co., Ltd.) made of cellulose and a sodium salt of carboxymethyl cellulose; SOLUBLON (produced by Aicello Corporation), Hi-Selon (produced by PVOH Film), Tosslon (produced by Tokyo Cellophane Co., Ltd.), and KURARAY VINYLON FILM (produced by Kuraray Co., Ltd.), which are made of a polyvinyl alcohol-based polymer; and ALKOX (polyethylene oxide resin) film (produced by Meisei Chemical Works, Ltd.) and Flexine (a film formed of a water-soluble resin Paogen including polyoxyalkylene glycol, polycarboxylic acid, and a lower alkyl ester thereof, produced by Dai-Ichi Kogyo Seiyaku Co., Ltd.) as polyalkylene oxide-based products.

In particular, the water-soluble resin is particularly preferably a polyvinyl alcohol-based polymer in terms of film strength and water solubility, for example. That is, the water-soluble film of the present invention particularly preferably includes a polyvinyl alcohol-based polymer and a polyamine backbone-containing compound.

The following further describes the polyvinyl alcohol-based polymer.

The polyvinyl alcohol-based polymer is prepared by polymerizing a vinyl ester and optionally a monomer other than vinyl esters (also referred to as different monomer) as needed to prepare a polyvinyl ester (polyvinyl ester-based polymer) and saponifying the polyvinyl ester, and has a structural unit represented by the following formula (5). In the formula, p represents an average degree of polymerization and is 1 or greater.

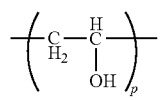

(5)

The vinyl ester (monomer) constituting the polyvinyl ester-based polymer may be one or two or more of vinyl acetate, vinyl formate, vinyl propionate, vinyl valerate, vinyl caprate, vinyl laurate, vinyl myristate, vinyl palmitate, vinyl benzoate, vinyl stearate, vinyl pivalate, and vinyl versatate. In particular, vinyl acetate is preferred in terms of productivity or availability.

The monomers constituting the polyvinyl ester-based polymer may include the above-described different monomer as needed. Examples of the different monomer include N-vinylformamide-based monomers such as N-vinylformamide and N-methyl-N-vinylformamide; N-vinylacetamide-based monomers such as N-vinylacetamide and N-methyl-N-vinylacetamide; N-vinylpyrrolidone-based monomers such as N-vinyl-2-pyrrolidone, N-vinyl-3-propyl-2-pyrrolidone, and N-vinyl-5,5-dimethyl-2-pyrrolidone; N-vinylcaprolactam-based monomers such as N-vinyl-2-caprolactam and N-vinyl-3-propyl-2-caprolactam; oxyalkylene group-containing unsaturated monomers such as polyoxyethylene (meth)allyl ether, polyoxypropylene (meth)allyl ether, polyoxyethylene (meth)acrylate, polyoxypropylene (meth)acrylate, polyoxyethylene (meth)acrylamide, polyoxypropylene (meth)acrylamide, polyoxyethylene (1-(meth)acrylamido-1,1-dimethylpropyl)ester, polyoxyethylene vinyl ether, and polyoxypropylene vinyl ether; vinyl ether-based monomers such as methyl vinyl ether, ethyl vinyl ether, propyl vinyl ether, butyl vinyl ether, ethylene glycol vinyl ether, 1,3-propanediol vinyl ether, and 1,4-butanediol vinyl ether; α-olefins such as ethylene, propylene, and 1-hexene; acrylamide derivatives such as acrylamide and N-methylacrylamide; methacrylamide derivatives such as methacrylamide and N-methylmethacrylamide; allyl acetate; allyl ethers such as propyl allyl ether; vinylsilanes such as vinyltrimethoxysilane; isopropenyl acetate; hydroxy group-containing α-olefins such as 3-buten-1-ol, 4-penten-1-ol, 5-hexen-1-ol, and 7-octen-1-ol; monomers containing a sulfonic acid group derived from ethylenesulfonic acid, allylsulfonic acid, methallylsulfonic acid, or 2-acrylamido-2-methylpropanesulfonic acid, for example; and monomers containing a cationic group derived from vinyloxyethyltrimethylammonium chloride, vinyloxybutyltrimethylammonium chloride, vinyloxyethyldimethylamine, vinyloxymethyldiethylamine, N-acrylamidomethyltrimethylammonium chloride, N-acrylamidoethyltrimethylammonium chloride, N-acrylamidodimethylamine, allyltrimethylammonium chloride, methallyltrimethylammonium chloride, dimethylallylamine, or allylethylamine, for example. One or two or more of these may be used.

The amount of the different monomer in 100 mol % of all the monomers constituting the polyvinyl ester-based polymer is preferably 50 mol % or less, more preferably 20 mol % or less, still more preferably 10 mol % or less, particularly preferably 1 mol % or less.

The polyvinyl alcohol-based polymer preferably has an average degree of saponification of 50 to 100 mol % in order to more enhance the film strength and the solubility in cold water, for example. The lower limit of the average degree of saponification is more preferably 60 mol % or more, still more preferably 70 mol % or more. The upper limit thereof is more preferably less than 100 mol %, still more preferably 99 mol % or less, particularly preferably 95 mol % or less. Saponification will be described in more detail below.

The average degree of polymerization (p in the formula (5)) of the polyvinyl alcohol-based polymer is preferably 200 to 10000 in order to more enhance the film strength and the solubility in cold water, for example. The average degree of polymerization is more preferably 500 or higher, still more preferably 1000 or higher. The average degree of polymerization is more preferably 6000 or lower, still more preferably 4000 or lower.

The polyvinyl alcohol-based polymer may be produced by a method that includes polymerizing a vinyl ester and optionally a different monomer to prepare a vinyl ester-based polymer and saponifying the vinyl ester-based polymer in a solvent, for example.

The polymerization of the vinyl ester and the different monomer constituting the vinyl ester-based polymer may be performed by solution polymerization, suspension polymerization, emulsion polymerization, bulk polymerization, or precipitation polymerization, for example. When a solvent is used, known solvents such as alcohols may be used as a solvent. Examples of an initiator used in the polymerization include azo polymerization initiators such as 2,2'-azobis (isobutyronitrile) and peroxides such as benzoyl peroxide. The polymerization temperature may be set within the range of 0° C. to 150° C., for example.

The polyvinyl alcohol-based polymer can be obtained by saponifying the vinyl ester-based polymer. Examples of a saponification solvent include alcohols such as methanol and ethanol, esters such as methyl acetate and ethyl acetate, dimethyl sulfoxide, and solvent mixtures thereof. Examples of a saponification catalyst include sodium hydroxide, potassium hydroxide, sulfuric acid, hydrochloric acid, and hydrogen peroxide. Other conditions of the saponification reaction may be appropriately adjusted depending on the target degree of saponification, for example. For example, the reaction temperature and the reaction time may be set at 0° C. to 200° C. and 0.1 to 24 hours, respectively.

<Different Component>

The water-soluble film of the present invention may optionally contain one or two or more components (also referred to as a different component) other than the polyamine backbone-containing compound and the water-soluble resin, as needed. Examples of the different component include, but are not limited to, various additives and various polymers.

The amount of the different component is preferably 0% to 20% by mass, more preferably 1% to 10% by mass of 100% by mass of the water-soluble film of the present invention.

[Method for Producing Water-Soluble Film]

The water-soluble film of the present invention can be obtained from a polyamine backbone-containing compound. In particular, the water-soluble film is preferably produced by a production method that includes a step of mixing a polyamine backbone-containing compound and a water-soluble resin (also referred to as a mixing step). The production method preferably further includes a film-forming step, and may include one or two or more other steps applicable to usual preparation of films.

The polyamine backbone-containing compound may be a commercially available product, or may be one obtained by a production method that includes a step of polymerizing one or two or more amines (preferably alkyleneimines).

When a compound having a structure in which at least one amino group is modified is used as the polyamine backbone-containing compound, a polyamine (preferably polyalkyleneimine) is preferably subjected to the addition reaction as described above. That is, the production method preferably includes a step of adding to a polyamine at least one selected from the group consisting of alkylene oxides, carboxylic acid-based monomers, hydrophobic group-containing monomers, sulfonic acid-based monomers, and epoxy group-containing compounds. This step is as described above.

The following further describes the respective steps.

<Mixing Step>

The mixing step is a step of mixing a polyamine backbone-containing compound and a water-soluble resin (preferably polyvinyl alcohol-based polymer). In the mixing step, a different component may be further mixed therewith. These components may be mixed all at once, or after part of components to be mixed is mixed, the remaining portion may be mixed therewith.

In the mixing step, the polyamine backbone-containing compound, the water-soluble resin, and optionally the different component may be mixed by any means. For example, they may be dissolved or dispersed in a solvent or may be melt-kneaded, for example. When a solvent is used, the solvent may be, but not limited to, water, an organic solvent, or a solvent mixture of water and an organic solvent. Examples of the organic solvent include, but are not limited to, dimethyl sulfoxide, dimethylformamide, dimethylacetamide, methanol, ethanol, n-propanol, propanol, phenol, ethylene glycol, propylene glycol, n-butanol, toluene, xylene, ethyl acetate, n-propyl acetate, n-butyl acetate, isobutyl acetate, n-amyl acetate, tetrahydrofuran, dioxane, dimethyl acetamide, chloroform, acetone, methyl ethyl ketone, methyl isobutyl ketone, cyclohexanone, ethylene glycol monomethyl ether, propylene glycol monomethyl ether, propylene glycol monoethyl ether, propylene glycol tertiary butyl ether, 3-methyl-3-methoxy butanol, dipropylene glycol monomethyl ether, ethylene glycol monomethyl ether, ethylene glycol monoethyl ether, ethylene glycol monobutyl ether, diethylene glycol monoethyl ether, and diethylene glycol monobutyl ether. Preferred among these is water.

The mixing step is preferably performed at a temperature of 20° C. to 90° C. In such a mixing step, the polyamine backbone-containing compound and the water-soluble resin (preferably polyvinyl alcohol-based polymer) are more sufficiently mixed. Thus, a more highly uniform water-soluble film can be obtained. The temperature is more preferably 50° C. to 90° C.

<Film-Forming Step>

The film-forming step is a step of forming a film using a mixture obtained in the mixing step. The film may be formed by any means, for example, by a method in which the mixture is applied to a base material, dried or hardened, and as needed, peeled from the base material (referred to as an application method or a coating method), a method in which a film formed from the mixture is thermocompression-bonded to a support, or a kneading method. Among these, the application method is preferably used.

[Uses]

The water-soluble film of the present invention has an excellent solubility in cold water, extensibility, and chemical resistance. Therefore, the water-soluble film is particularly useful as packaging materials for chemicals such as agrochemicals or detergents. That is, the water-soluble film of the present invention is preferably used to package a chemical and/or a detergent. Further, the water-soluble film of the present invention is preferably one suitable for packaging a chemical and/or a detergent. An object to be packaged (e.g. chemicals) may be in any form (e.g. powder, granules, liquid) and may have any size or any particle size distribution. For example, the detergent may suitably be any of powder detergents, liquid detergents, and gel detergents. Further, an object to be packaged may optionally contain any additive such as a dispersant, a bonding agent, or a surfactant, as needed. The water-soluble film of the present invention further functions as a builder that has excellent anti-soil redeposition properties and excellent detergency, and is therefore particularly useful as packaging materials for detergents.

<Composition>

Another aspect of the present invention relates to a composition (mixture) containing a polyamine backbone-containing compound and a water-soluble resin. The water-soluble film of the present invention can be favorably obtained by forming the composition into a film. The composition can be obtained by mixing a polyamine backbone-containing compound and a water-soluble resin (preferably polyvinyl alcohol-based polymer).

<Packaged Product>

Another aspect of the present invention relates to a packaged product including the water-soluble film of the present invention and a chemical and/or a detergent packaged in the water-soluble film. The packaged product of the present invention is, for example, a packaged product that includes a water-soluble film containing a polyamine backbone-containing compound and a water-soluble resin (preferably polyvinyl alcohol-based polymer) and a chemical and/or a detergent packaged in the water-soluble film. The forms and sizes of the packaged product and the chemical and/or the detergent in the packaged product are not limited, and may be appropriately designed. The form of the package may be a hermetically sealed package or a non-hermetically sealed package. In order to more readily and safely use a packaged product, a hermetically sealed package is preferred, for example.

<Method for Producing Packaged Product>

Another aspect of the present invention relates to a method for producing a packaged product including packaging a chemical and/or a detergent with the water-soluble film of the present invention. The method for producing a packaged product of the present invention is, for example, a water-soluble film production method that includes a step of mixing a polyamine backbone-containing compound and a water-soluble resin (preferably polyvinyl alcohol-based polymer), a step of forming a film using a mixture obtained in the mixing step, and a step of packaging a chemical and/or a detergent with the water-soluble film obtained in the film-forming step.

<Packaging Method, Etc.>

Another aspect of the present invention relates to a packaging method including packaging a chemical and/or a detergent with the water-soluble film of the present invention. The packaging method of the present invention is, for example, a packaging method that includes a step of mixing a polyamine backbone-containing compound and a water-soluble resin (preferably polyvinyl alcohol-based polymer), a step of forming a film using a mixture obtained in the mixing step, and a step of packaging a chemical and/or a detergent with the water-soluble film obtained in the film-forming step. The present invention also relates to a method for using a water-soluble film of the present invention, including a step of packaging a chemical and/or a detergent with the water-soluble film of the present invention. The using method of the present invention is, for example, a method for using a water-soluble film, including a step of mixing a polyamine backbone-containing compound and a water-soluble resin (preferably polyvinyl alcohol-based polymer), a step of forming a film using a mixture obtained in the mixing step, and packaging a chemical and/or a detergent with the water-soluble film obtained in the film-forming step.

EXAMPLES

The present invention is described in more detail below with reference to the examples, but the present invention is not limited to only these examples. Unless otherwise stated, "%" means "% by mass".

In the following examples and comparative examples, a polyvinyl alcohol-based polymer (weight average molecular weight: 85000 to 124000, degree of saponification: 87% to 89%), which is a reagent produced by ALDRICH, was used as a polyvinyl alcohol-based polymer (PVA). Hereinafter, the polyvinyl alcohol-based polymer is also simply referred to as a polyvinyl alcohol.

<Method for Measuring Weight Average Molecular Weight (Mw)>

(1) Conditions 1 for GPC Measurement

The weight average molecular weights (Mw) of the polyamine backbone-containing compounds used in the following examples were measured under the following conditions.

Apparatus: GPC apparatus produced by Shimadzu Corporation
 Detector: RI detector
 Columns: SHODEX Asahipak GF-710-HQ, GF-510-HQ, and GF-310-HQ produced by Showa Denko K.K.
 Reference material: Pullulan P-82 (produced by Wako Pure Chemical Industries, Ltd.)
 Eluent: an eluent with a pH of 5.1 adjusted by adding acetic acid to a 0.2 mol % aqueous solution of monoethanolamine (2) Conditions 2 for GPC Measurement The weight average molecular weight (Mw) of the polyacrylic acid (HL-415) used in Comparative Example 2 was measured under the following conditions.

Apparatus: HLC-8320GPC produced by Tosoh Corporation
 Detector: RI
 Column: One TSK-guard column and two TSK-GEL G3000PWXL columns (three columns in total) produced by Tosoh Corporation connected in series
 Column temperature: 35° C.
 Flow rate: 0.5 ml/min
 Calibration curve: POLY SODIUM ACRYLATE STANDARD produced by Sowa Kagaku Co., Ltd.
 Eluent: A dilution prepared by diluting a mixture of sodium dihydrogenphosphate dodecahydrate/disodium hydrogenphosphate dihydrate (34.5 g/46.2 g) with 5000 g of pure water
 Calibration curve: POLYACRYLIC ACID STANDARD produced by American Polymer Standard Corp.

<Preparation of Film>

Example 1

To a 50-mL screw tube were added 1.2 g of EPOMIN SP-003 (polyethylenimine (PEI), average molecular weight: 300, hereinafter also referred to as "SP-003") produced by Nippon Shokubai Co., Ltd., 4.8 g of polyvinyl alcohol, and 34.0 g of water in the stated order. The solids were dissolved while the contents were repeatedly heated and stirred in a water bath having a temperature of 70° C. to prepare an aqueous solution with a solid content of 15%. The resulting aqueous solution was applied to a release film (a PET film treated with silicon) using an applicator. The aqueous solution was applied to a thickness such that the dried matter of the aqueous solution had a thickness falling within the range of 10 μm to 20 μm. The release film after the application treatment was dried in a hot air circulating oven at 100° C. for 10 minutes. Then, the release film was taken out from the oven and cooled to room temperature, and was then removed to obtain a water-soluble film 1.

Example 2

To a 50-mL screw tube were added 1.2 g of EPOMIN SP-006 (PEI, average molecular weight: 600, hereinafter also referred to as "SP-006") produced by Nippon Shokubai Co., Ltd., 4.8 g of polyvinyl alcohol, and 34.0 g of water in the stated order. The solids were dissolved while the contents were repeatedly heated and stirred in a water bath having a temperature of 70° C. to prepare an aqueous solution having a solid content of 15%. The resulting aqueous solution was subjected to the same steps as in Example 1 to obtain a water-soluble film 2.

Example 3

To a 50-mL screw tube were added 1.2 g of EPOMIN SP-200 (PEI, average molecular weight: 10000, hereinafter also referred to as "SP-200") produced by Nippon Shokubai Co., Ltd., 4.8 g of polyvinyl alcohol, and 34.0 g of water in the stated order. The solids were dissolved while the contents were repeatedly heated and stirred in a water bath having a temperature of 70° C. to prepare an aqueous solution having a solid content of 15%. The resulting aqueous solution was subjected to the same steps as in Example 1 to obtain a water-soluble film 3.

Example 4

To a 50-mL screw tube were added 2.4 g of EPOMIN SP-006 produced by Nippon Shokubai Co., Ltd., 3.6 g of polyvinyl alcohol, and 34.0 g of water in the stated order.

The solids were dissolved while the contents were repeatedly heated and stirred in a water bath having a temperature of 70° C. to prepare an aqueous solution having a solid content of 15%. The resulting aqueous solution was subjected to the same steps as in Example 1 to obtain a water-soluble film 4.

Example 5

To a 50-mL screw tube were added 0.3 g of EPOMIN SP-006 produced by Nippon Shokubai Co., Ltd., 5.7 g of polyvinyl alcohol, and 34.0 g of water in the stated order. The solids were dissolved while the contents were repeatedly heated and stirred in a water bath having a temperature of 70° C. to prepare an aqueous solution having a solid content of 15%. The resulting aqueous solution was subjected to the same steps as in Example 1 to obtain a water-soluble film 5.

Example 6

EPOMIN SP-006 produced by Nippon Shokubai Co., Ltd. was ethoxylated with an ethylene oxide (EO) in an amount of 20 mol per mole of nitrogen atom to synthesize a polyethylenimine ethylene oxide copolymer (hereinafter also referred to as "PN-100"). To a 50-mL screw tube were added 1.2 g of PN-100, 4.8 g of polyvinyl alcohol, and 34.0 g of water in the stated order. The solids were dissolved while the contents were repeatedly heated and stirred in a water bath having a temperature of 70° C. to prepare an aqueous solution having a solid content of 15%. The resulting aqueous solution was subjected to the same steps as in Example 1 to obtain a water-soluble film 6.

Example 7

A 500-mL glass separable flask equipped with a thermometer, a reflux condenser, and a stirrer was charged with 151.3 g of pure water and 165.0 g of EPOMIN P-1000 (PEI, average molecular weight: 70000, resin content: 30%, hereinafter, also referred to as "P-1000") produced by Nippon Shokubai Co., Ltd., and they were heated to 90° C. under stirring. Subsequently, 93.2 g of a 80% by mass aqueous solution of acrylic acid (hereinafter, also referred to as "80% AA") was dropwise added to the polyethylenimine aqueous solution maintained at a constant temperature of 90° C. through a dropping nozzle over 180 minutes under stirring. After the dropwise addition of 80% AA, 34.5 g of a 48% aqueous solution of sodium hydroxide (hereinafter, also referred to as "48% NaOH") was dropwise added over 10 minutes to the reaction system maintained at a constant temperature of 90° C. under stirring. After the dropwise addition of 48% NaOH, the reaction solution was maintained for another 6 hours at 90° C., so that the solution was aged and the polymerization was completed. Thus, terminally carboxylic acid-modified polyethylenimine (solid content: 32%, hereinafter, also referred to as "AM-108") having a weight average molecular weight (Mw) of 320000 was obtained.

To a 50-mL screw tube were added 3.75 g of AM-108, 4.8 g of polyvinyl alcohol, and 31.45 g of water in the stated order. The solids were dissolved while the contents were repeatedly heated and stirred in a water bath having a temperature of 70° C. to prepare an aqueous solution having a solid content of 15%. The resulting aqueous solution was subjected to the same steps as in Example 1 to obtain a water-soluble film 7.

Comparative Example 1

To a 50-mL screw tube were added 34.0 g of water and 6.0 g of polyvinyl alcohol in the stated order. The solids were dissolved while the contents were repeatedly heated and stirred in a water bath having a temperature of 70° C. to prepare an aqueous solution having a solid content of 15%. The resulting aqueous solution was subjected to the same steps as in Example 1 to obtain a comparative water-soluble film 1.

Comparative Example 2

To a 50-mL screw tube were added 5.2 g of AQUALIC HL-415 (polyacrylic acid, Mw: 12000, solid content: 46%, hereinafter, also referred to as "HL-415") produced by Nippon Shokubai Co., Ltd., 3.6 g of polyvinyl alcohol, and 31.2 g of water in the stated order. The solids were dissolved while the contents were repeatedly heated and stirred in a water bath having a temperature of 70° C. to prepare an aqueous solution having a solid content of 15%. The resulting aqueous solution was subjected to the same steps as in Example 1 to obtain a comparative water-soluble film 2.

Comparative Example 3

To a 50-mL screw tube were added 2.4 g of polyvinyl pyrrolidone (PVP, solid content: 49%, hereinafter, also referred to as "PVP K30") produced by Nippon Shokubai Co., Ltd., 4.8 g of polyvinyl alcohol, and 32.8 g of water in the stated order. The solids were dissolved while the contents were repeatedly heated and stirred in a water bath having a temperature of 70° C. to prepare an aqueous solution having a solid content of 15%. The resulting aqueous solution was subjected to the same steps as in Example 1 to obtain a comparative water-soluble film 3.

The polymers blended in the examples and the comparative examples were specifically shown in Table 1. Further, the films obtained in the examples and the comparative examples were subjected to the following evaluation tests. The results are shown in Table 2.

<Evaluation Tests of Films>
1. Solubility

A 100-mL beaker was charged with 100 g of pure water having a temperature of 5° C., and the water was stirred using a magnetic stirrer and a stirring bar. A 4×4 cm film specimen cut from each film was placed in water under stirring, and the time required for completely dissolving the film specimen (time from when the film specimen was placed in water until when the film specimen disappeared from view) was measured. The resulting time (dissolution time) is shown in Table 2. Further, these dissolution times were converted to the dissolution times of a 40-μm-thick film using the following formula. A shorter dissolution time means better solubility.

Dissolution time (in the case of 40 μm) (second)= (40/thickness of film (μm))$^2$×dissolution time (second)

The thickness of the film was measured using Coolant Proof Micrometer 1265. The thicknesses of six random points of the film were measured and averaged to determine the average thickness of the film.

2. Hard Water Resistance

To a 1-L beaker containing 67.6 g of glycine and 52.6 g of sodium chloride were added pure water and 48% sodium hydroxide to prepare 600 g of a glycine buffer stock solution with a pH of 10. A 54.0-g portion of the glycine buffer stock solution was placed in a 1-L beaker and diluted with pure water to prepare 1000 g of a glycine buffer dilution. Separately, a film was dissolved in water to prepare a 2.5% aqueous solution of the film. To 2.5 g of the aqueous solution of the film was added a 80-g portion of the glycine buffer dilution. Thus, a test solution was prepared. Separately, a 1 mol/L aqueous solution of calcium chloride was prepared as hard water. A 0.1-mL portion of the hard water was dropwise added to the test solution every three seconds using an automatic titrator COM-1700 produced by Hiranuma Sangyo Corporation. At the time when 6 mL of the hard water was dropwise added in total, the transmittance (%) of 650-nm light was measured. A value closer to 100 means better hard water resistance.

3. Strength

A 11.84-g metal ball was dropped freely onto a 3×3 cm film specimen cut from each film. The position from which the ball is dropped was adjusted, and the potential energy of the metal ball at the height of the drop-start position that leads to film breakage was determined as strength using the following formula:

$$\text{Strength (J)}=0.01184 \text{ (kg)} \times 9.8 \text{ (m/s}^2\text{)} \times \text{height from which metal ball was dropped (m)}.$$

Further, the thus-determined value was converted to the strength of a 40-μm-thick film using the following formula:

$$\text{Strength (in the case of 40 μm) (J)}=(40/\text{thickness of film (μm)})^2 \times \text{strength (J)}.$$

A larger value means higher strength.

The thickness of the film was measured using Coolant Proof Micrometer IP65. The thicknesses of six random points of the film were measured and averaged to determine the average thickness of the film.

4. Extensibility

A 1.5×9.0 cm film specimen cut from each film was stretched using a tensile testing machine (produced by Shimadzu Corporation, Autograph AGS-100D) under the conditions of room temperature, initial gage length of 60 mm, and tensile speed of 5 mm/min, and the strain when the film broke (maximum strain) (%) was evaluated as extensibility. A larger maximum strain means higher extensibility.

5. Deodorant Properties

A glass petri dish was prepared, and 2.5 g of a film was placed therein. Separately, an empty petri dish was prepared as a blank. These petri dishes were each completely sealed in a sampling bag with a sleeve (produced by GL Sciences Inc., Smart Bag PA, volume: 3 L) by heat sealing. A vacuum was created in each sampling bag, and then 2 L of nitrogen gas was introduced thereinto. Each petri dish was opened in the bag, and then 5 mL of acetic acid-saturated nitrogen gas was introduced thereinto using a syringe. After two-hour standing, 100 mL of the air was suctioned from the bag and the reduction rate (%) was determined by comparison of the acetic acid concentrations using an acetic acid detector tube (produced by Gastec Corporation, No. 81 or 81L). The measured value was converted to the acetic acid concentration using the conversion scale described in the manual of the detector tube.

The reduction rate of the acetic acid was determined using the following equation.

$$\text{Reduction rate (\%)}=\{(\text{Gas concentration for blank})-(\text{Gas concentration for sample})\}\div(\text{Gas concentration for blank})\times 100$$

6. Anti-Soil Redeposition Properties

A polyester textile obtained from Test fabric Inc. was cut into 5 cm×5 cm pieces of white cloth. The brightness of each of white cloth pieces was previously measured with a color difference meter SE6000 produced by Nippon Denshoku Industries Co., Ltd. based on the reflectance. Pure water was added to 4.41 g of calcium chloride dihydrate to prepare 15 kg of hard water. Separately, pure water was added to 4.0 g of sodium dodecylbenzenesulfonate, 6.0 g of sodium carbonate, and 2.0 g of sodium sulfate to prepare 100.0 g of an aqueous surfactant solution. The temperature of a Terg-O-tometer was set at 25° C. A pot was charged with 1 L of the hard water, 5 g of the aqueous surfactant solution, 1 g of a 10% (in terms of solid content) aqueous solution of the film obtained in the corresponding example or comparative example, 0.15 g of zeolite, and 0.25 g of carbon black. The contents were stirred at 100 rpm for one minute. Thereafter, five white cloth pieces were placed in the pot and stirred at 100 rpm for 10 minutes. Water was removed from the white cloth pieces by hand, and the white cloth pieces were placed in a pot containing 1 L of tap water at 25° C. They were stirred at 100 rpm for two minutes. Water was again removed from the white cloth pieces by hand, and the white cloth pieces were placed in a pot containing 1 L of tap water at 25° C. They were stirred at 100 rpm for two minutes. Water was removed from the white cloth pieces by hand, and the white cloth pieces were covered with an ironing cloth and smoothed with an iron to dry. Thereafter, the brightness of each of the white cloth pieces was again measured with the color difference meter based on the reflectance. The anti-soil redeposition rate (%) was determined from the above measurement results using the following equation. A higher anti-soil redeposition rate means better anti-soil redeposition properties.

$$\text{Anti-soil redeposition rate (\%)}=(\text{Brightness after washing})/(\text{Brightness of original white cloth})\times 100$$

7. Carbon Black Dispersion Ability

Pure water was added to 67.56 g of glycine, 52.60 g of sodium chloride, and 5.00 g of 48% sodium hydroxide to prepare 600.0 g of a mixture, and the mixture was adjusted to a pH of 10 with 48% sodium hydroxide to prepare a glycine buffer. Next, pure water was added to 6.00 g of the glycine buffer and 11.10 g of ethanol to prepare 1000.0 g of a dispersion. Separately, about 10 g of a 5.0% aqueous solution of the film (in terms of solid content) obtained in the corresponding example or comparative example was prepared. To a 100-ml screw-cap bottle containing 0.03 g of carbon black were added 9.0 g of the 5.0% aqueous solution of the film and 81.0 g of the dispersion to prepare a test solution. The screw-cap bottle containing the test solution was treated in an ultrasonic bath for five minutes. Then, a 10-mm stirrer bar was placed therein and the test solution was further stirred at 500 rpm for five minutes. After the stirring was stopped and the test solution was allowed to stand for three hours, the appearance of the test solution was observed. Evaluation was performed based on the following criteria.

(1) Hydration of Carbon Black

Good: Carbon black was hardly visually observed at the liquid surface.

Fair: A small amount of carbon black floating on the liquid surface was visually observed.

Bad: A large amount of carbon black floating on the liquid surface was visually observed.

(2) Dispersion of Carbon Black

Good: Much better dispersion of carbon black in the liquid was visually observed.

Fair: Uniform dispersion of carbon black in the liquid was visually observed.

Bad: No dispersion of carbon black in the liquid was visually observed.

8. Detergency

Artificially contaminated wet cloth was obtained as artificially contaminated cloth from Laundry Science Association (Sentaku Kagaku Kyokai). The brightness of the artificially contaminated cloth was previously measured with a color difference meter SE6000 (produced by Nippon Denshoku Industries Co., Ltd.) based on the reflectance. Pure water was added to 1.47 g of calcium chloride dihydrate to prepare 10 kg of hard water. Separately, pure water was added to 4.8 g of polyoxyethylene lauryl ether sodium sulfate (AES), 0.6 g of polyoxyethylene lauryl ether (AE), 0.6 g of sodium borate, 0.9 g of citric acid, and 2.4 g of propylene glycol to prepare 80 g of a mixture. The mixture was adjusted to a pH of 8.2 with an aqueous sodium hydroxide solution, and pure water was added to the solution to prepare 100 g of an aqueous surfactant solution. The temperature of a Terg-o-Tometer was set at 27° C. A pot was charged with 1000 mL of the hard water, 5 mL of a 2.75% solution of the film (in terms of solid content) obtained in the corresponding example or comparative example, 4.8 mL of the aqueous surfactant solution, five pieces of artificially contaminated cloth, and five pieces of cotton white cloth prepared in conformity with JIS L 0803. The contents were stirred at 100 rpm for 10 minutes. The artificially contaminated cloth pieces were taken out from the pot, and water was removed therefrom by hand. Next, 1000 mL of the hard water was placed in a pot and then the artificially contaminated cloth pieces from which water was removed were placed therein, and they were stirred at 100 rpm for two minutes. The artificially contaminated cloth pieces were taken out from the pot, and water was removed therefrom by hand. The artificially contaminated cloth pieces were covered with an ironing cloth and smoothed with an iron to dry. The brightness of each of the dried artificially contaminated cloth pieces was measured with a color difference meter based on the reflectance. The washing rate (%) was determined based on the values determined by this method using the following equation.

Washing rate (%)={(Brightness of artificially contaminated cloth pieces after washing)−(brightness of artificially contaminated cloth before washing)}÷{(brightness of original white cloth (EMPA221) before artificially contaminated)−(brightness of artificially contaminated cloth before washing)}×100

TABLE 1

| | Structure | Mw | Solid content (mass %) |
|---|---|---|---|
| SP-003 | Polyethylenimine (PEI) | 300 | 100 |
| SP-006 | Polyethylenimine (PEI) | 600 | 100 |
| SP-200 | Polyethylenimine (PEI) | 10000 | 100 |
| PN-100 | Adduct of PEI in which 20 mol of EO is added to its terminal NH | 14000 | 80 |
| AM-108 | Modified PEI in which 90% of its terminal NH is modified with carboxylic acid | 320000 | 32 |
| HL-415 | Polyacrylic acid | 12000 | 46 |
| PVP K30 | Polyvinylpyrrolidone | 30000 | 49 |

TABLE 2

| | Polymer blended | | Thickness μm | Dissolution time | | Hard water resistance % | Extensibility % |
|---|---|---|---|---|---|---|---|
| | Type | Blend proportion (mass %) | | Dissolution time second | (in the case of 40 μm) second | | |
| Example 1 | SP-003 | 20 | 48 | 300 | 207 | — | 140 |
| Example 2 | SP-006 | 20 | 47 | 240 | 175 | 98.7 | 143 |
| Example 3 | SP-200 | 20 | 47 | 150 | 109 | — | 78.5 |
| Example 4 | SP-006 | 40 | 52 | 240 | 228 | 98.0 | 213 |
| Example 5 | SP-006 | 5 | 42 | 243 | 243 | — | 45 |
| Example 6 | PN-100 | 20 | 77 | 150 | 40 | 99.2 | — |
| Example 7 | AM-108 | 20 | 40 | 58 | 58 | — | 5.6 |
| Comparative Example 1 | — | 0 | 28 | 120 | 245 | — | 21 |
| Comparative Example 2 | HL-415 | 40 | 13 | 5 | 47 | 93.4 | 3 |
| Comparative Example 3 | PVP K30 | 20 | 41 | 148 | 141 | — | 12 |

Table 2 demonstrates the followings.

Comparison between Examples 1 to 7 and Comparative Example 1, which differ mainly in whether a polyamine backbone-containing compound is used or not, shows a remarkable difference in solubility. Comparison between Example 4 and Comparative Example 2, which differ mainly in whether the polyamine backbone-containing compound in the present invention is used or polyacrylic acid is used, shows a remarkable difference particularly in hard water resistance and extensibility. Thus, the water-soluble films having a structure essentially containing a polyamine backbone-containing compound are found to have both high solubility in cold water and high hard water resistance. Further, comparison between Examples 1 to 3, 6, and 7 and Comparative Example 3, which differ mainly in whether the polyamine backbone-containing compound in the present invention is used or polyvinyl pyrrolidone is used, shows a difference in solubility or extensibility. This demonstrates that a water-soluble film excellent in solubility or extensibility is obtained even when it does not contain expensive polyvinyl pyrrolidone as an essential component.

Although not shown in the table, the films obtained in Examples 1 to 7 were also found to have high strength. The films obtained in Examples 1 to 7 were also found to be more excellent in anti-soil redeposition properties or detergency than the film obtained in Comparative Example 3 (polyvinyl pyrrolidone was used). The films obtained in Examples 1 to 7 were also found to have excellent deodorant properties or excellent dispersion ability of inorganic fine particles (carbon black).

The invention claimed is:
1. A water-soluble film formed from a mixture of components comprising:
a polyamine backbone-containing compound; and
a water-soluble resin, the polyamine backbone-containing compound having a structure in which at least one amino group is modified with at least one modifying group consisting of (poly) alkylene glycol groups, wherein the polyamine backbone-containing compound is obtained by introducing the (poly) alkylene glycol groups in which an average number of moles of alkylene oxide added is 2 to 300,
wherein the polyamine backbone-containing compound has a branched-chain structure and is represented by the following formula (1):

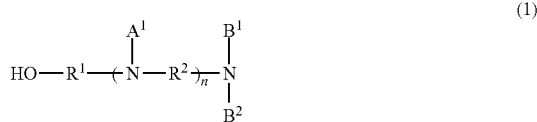

(1)

in which each $R^1$ and $R^2$ is the same as or different from each other and is a C2 alkylene group, wherein any hydrogen atom in any of $R^1$ or $R^2$ may be replaced with the at least one modifying group; each A1 is the same or different and is selected from the group consisting of hydrogen, another polyamine backbone as a branch represented by formula (2), and the at least one modifying group, wherein any hydrogen atom in formula (2) may be replaced with the at least one modifying group; and $B^1$ and $B^2$ are independently selected from the group consisting of hydrogen and the at least one modifying group:

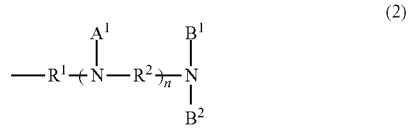

(2)

in which $R^1$, $R^2$, $A^1$, $B^1$, and $B^2$ in formula (2) are as defined in formula (1), and may be the same as or different from the specific $R^1$, $R^2$, $A^1$, $B^1$, and $B^2$ in formula (1), and
each n in formula (1) and formula (2) independently represents an integer of 2 or greater,
wherein the polyamine backbone-containing compound has a weight average molecular weight of 200 to 80,000,
wherein the water-soluble resin is a polyvinyl alcohol-based polymer,
the polyvinyl alcohol-based polymer having an average degree of saponification of 70 mol % or more and 95 mol % or less,
wherein a proportion of the polyamine backbone-containing compound is 5% by mass or more and 40% by mass or less of 100% by mass of the total amount of the water-soluble resin and the polyamine backbone-containing compound, wherein the water-soluble film has an extensibility of 23% or higher when stretched using a tensile testing machine at room temperature, an initial gauge length of 60 mm, and tensile speed of 5 mm/min; a dissolution time in 100 g of water between 5 and 240 seconds at a water temperature selected at a temperature between 5° C. and 15° C. while being stirred using a magnetic stirrer and a stirring bar; and a hard water resistance of 94% or higher,
wherein the water-soluble film has a thickness of 10 to 300 μm.

2. The water-soluble film according to claim 1, wherein the water-soluble film packages a chemical and/or a detergent.

3. The water soluble film according to claim 1, wherein an amine value of the polyamine backbone-containing compound is between 5 and 30 mg KOH/g.

4. The water soluble film according to claim 1, wherein the polyamine backbone-containing compound has a mol % of ethyleneimine between 50 to 100 mol % of all alkyleneimines.

5. The water-soluble film according to claim 1, wherein the polyamine backbone-containing compound contains a primary amino group, a secondary amino group, and a tertiary amino group.

6. The water-soluble film according to claim 1, wherein the weight average molecular weight of the polyamine backbone-containing compound is 550 to 20,000.

7. The water-soluble film according to claim 1, wherein the at least one modified amino group includes a terminal amino group of the polyamine backbone-containing compound.

8. The water-soluble film according to claim 1, wherein the at least one modified amino group includes an amino group of a main chain of the polyamine backbone-containing compound.

9. The water-soluble film according to claim 1, wherein the at least one modified amino group includes a terminal amino group and an amino group of a main chain of the polyamine backbone-containing compound.

10. The water-soluble film according to claim 1, wherein the average number of moles of the alkylene oxide added is 10 to 50.

11. The water-soluble film according to claim 1, wherein an average degree of polymerization of the polyvinyl alcohol-based polymer is 200 to 10000.

12. The water-soluble film according to claim 1, wherein an amount of one or more different components other than the polyamine backbone-containing compound and the water-soluble resin is 0% to 10% by mass of 100% by mass of the water-soluble film.

13. The water-soluble film according to claim 1, wherein the water-soluble film has the thickness of 40 to 300 μm.

14. A packaged product comprising:
the water-soluble film according to claim 1; and
a chemical and/or a detergent packaged in the water-soluble film.

15. A method for producing a packaged product, comprising packaging a chemical and/or a detergent with the water-soluble film according to claim 1.

16. A method for producing a water-soluble film formed from a mixture of components containing a polyamine backbone-containing compound and a water-soluble resin, the method comprising mixing the polyamine backbone-containing compound and the water-soluble resin, and subsequently forming a film from the resultant mixture, the polyamine backbone-containing compound having a structure in which at least one amino group is modified with at least one modifying consisting of (poly) alkylene glycol groups, wherein the polyamine backbone-containing compound is obtained by introducing the (poly) alkylene glycol groups in which an average number of moles of alkylene oxide added is 2 to 300, wherein the polyamine backbone-containing compound has a branched-chain structure and is represented by the following formula (1):

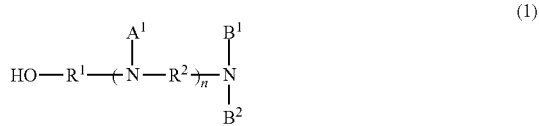

(1)

in which each $R^1$ and $R^2$ is the same as or different from each other and is a C2 alkylene group, wherein any hydrogen atom in any of $R^1$ or $R^2$ may be replaced with the at least one modifying group; each $A^1$ is the same or different and is selected from the group consisting of hydrogen, another polyamine backbone as a branch represented by formula (2), and the at least one modifying group, wherein any hydrogen atom in formula (2) may be replaced with the at least one modifying group; and $B^1$ and $B^2$ are independently selected from the group consisting of hydrogen and the at least one modifying group:

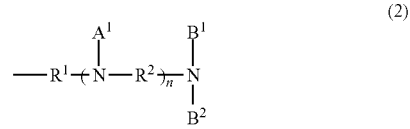

(2)

in which $R^1$, $R^2$, $A^1$, $B^1$, and $B^2$ in formula (2) are as defined in formula (1), and may be the same as or different from the specific $R^1$, $R^2$, $A^1$, $B^1$, and $B^2$ in formula (1), and each n in formula (1) and formula (2) independently represents an integer of 2 or greater, wherein the polyamine backbone-containing compound has a weight average molecular weight of 200 to 80,000, wherein the water-soluble resin is a polyvinyl alcohol-based polymer, the polyvinyl alcohol-based polymer having an average degree of saponification of 70 mol % or more and 95 mol % or less, wherein a proportion of the polyamine backbone-containing compound is 5% by mass or more and 40% by mass or less of 100% by mass of the total amount of the water-soluble resin and the polyamine backbone-containing compound, wherein the water-soluble film has an extensibility of 23% or higher when stretched using a tensile testing machine at room temperature, an initial gauge length of 60 mm, and tensile speed of 5 mm/min; a dissolution time in 100 g of water between 5 and 240 seconds at a water temperature selected at a temperature between 5° C. and 15° C. while being stirred using a magnetic stirrer and a stirring bar; and a hard water resistance of 94% or higher, wherein the water-soluble film has a thickness of 10 to 300 μm.

\* \* \* \* \*